(12) United States Patent
Xia et al.

(10) Patent No.: US 10,132,145 B2
(45) Date of Patent: *Nov. 20, 2018

(54) PRODUCED WATER TREATMENT AND SOLIDS PRECIPITATION FROM THERMAL TREATMENT BLOWDOWN

(71) Applicant: BL TECHNOLOGIES, INC., Minnetonka, MN (US)

(72) Inventors: Jiyang Xia, Shanghai (CN); Wenqing Peng, Shanghai (CN); Hai Yang, Shanghai (CN); Chunjie Liu, Shanghai (CN); Chang Wei, Shanghai (CN); Wei Cai, Shanghai (CN); Yiwen Sun, Shanghai (CN)

(73) Assignee: BL Technologies, Inc., Minnetonka, MN (US)

( * ) Notice: Subject to any disclaimer, the term of this patent is extended or adjusted under 35 U.S.C. 154(b) by 594 days.

This patent is subject to a terminal disclaimer.

(21) Appl. No.: 14/428,213

(22) PCT Filed: Aug. 22, 2013

(86) PCT No.: PCT/US2013/056175
§ 371 (c)(1),
(2) Date: Mar. 13, 2015

(87) PCT Pub. No.: WO2014/042842
PCT Pub. Date: Mar. 20, 2014

(65) Prior Publication Data
US 2015/0252658 A1 Sep. 10, 2015

Related U.S. Application Data

(60) Provisional application No. 61/700,520, filed on Sep. 13, 2012.

(30) Foreign Application Priority Data

Sep. 13, 2012 (CA) ..................... 2789822

(51) Int. Cl.
*E21B 43/24* (2006.01)
*E21B 43/34* (2006.01)
(Continued)

(52) U.S. Cl.
CPC ........ *E21B 43/2408* (2013.01); *B01D 9/0004* (2013.01); *B01D 11/0288* (2013.01);
(Continued)

(58) Field of Classification Search
CPC ...... E21B 43/40; E21B 43/24; E21B 43/2408; E21B 43/34; C02F 9/00; C02F 1/048;
(Continued)

(56) References Cited

U.S. PATENT DOCUMENTS

| 4,305,829 | A | | 12/1981 | Kelsey et al. |
| 5,574,027 | A | * | 11/1996 | Bernstein ............... A61K 31/28 514/184 |

(Continued)

FOREIGN PATENT DOCUMENTS

| CA | 2509309 | 12/2005 |
| CN | 1358671 A | 7/2002 |

(Continued)

OTHER PUBLICATIONS

Office Action and Search Report issued in connection with corresponding RU Application No. 2015107264 dated Jun. 23, 2017.
(Continued)

*Primary Examiner* — Jennifer H Gay

(57) ABSTRACT

Produced water, for example from a steam assisted gravity drainage (SAGD) or cyclic steam stimulation (CSS) heavy oil recovery operation, is treated to recover water that is (Continued)

re-used to create steam. The produced water is treated in one or more thermal treatment devices such as an evaporator and a crystallizer. The thermal treatment produces a slurry comprising dispersed or dissolved salts and organic compounds. A water-miscible solvent for one or more of the organic compounds, for example methanol, is added to the slurry. The solids precipitate and are separated from the slurry. The solvent may be recovered for re-use in treating more slurry.

30 Claims, 1 Drawing Sheet

(51) Int. Cl.
  *C02F 9/00*    (2006.01)
  *B01D 9/00*    (2006.01)
  *B01D 11/02*    (2006.01)
  *E21B 43/40*    (2006.01)
  *C02F 1/04*    (2006.01)
  *C02F 1/26*    (2006.01)
  *C02F 1/42*    (2006.01)
  *C02F 1/52*    (2006.01)
  *C02F 101/32*    (2006.01)
  *C02F 103/10*    (2006.01)

(52) U.S. Cl.
  CPC ............ *B01D 11/0292* (2013.01); *C02F 9/00* (2013.01); *E21B 43/2406* (2013.01); *E21B 43/34* (2013.01); *E21B 43/40* (2013.01); *B01D 2009/0086* (2013.01); *C02F 1/048* (2013.01); *C02F 1/26* (2013.01); *C02F 1/42* (2013.01); *C02F 1/5272* (2013.01); *C02F 2001/5218* (2013.01); *C02F 2101/32* (2013.01); *C02F 2103/10* (2013.01)

(58) Field of Classification Search
  CPC ...... C02F 1/26; C02F 1/52; C02F 1/72; C02F 2001/5218
  See application file for complete search history.

(56) References Cited

U.S. PATENT DOCUMENTS

| | | | | |
|---|---|---|---|---|
| 6,675,747 | B1 * | 1/2004 | Goidich | F22B 29/062 122/1 B |
| 6,786,696 | B2 | 9/2004 | Herman et al. | |
| 7,428,926 | B2 * | 9/2008 | Heins | C02F 1/04 166/266 |
| 7,438,129 | B2 * | 10/2008 | Heins | C02F 1/04 166/266 |
| 7,591,309 | B2 * | 9/2009 | Minnich | C02F 1/04 159/47.1 |
| 7,681,643 | B2 * | 3/2010 | Heins | E21B 43/24 159/24.1 |
| 7,686,079 | B2 * | 3/2010 | Gamache | C02F 1/5245 166/266 |
| 7,789,159 | B1 * | 9/2010 | Bader | B01D 61/04 166/279 |
| 8,506,467 | B2 * | 8/2013 | Minnich | E21B 43/2406 588/252 |
| 2005/0022989 | A1 * | 2/2005 | Heins | E21B 43/2406 166/272.3 |
| 2005/0279500 | A1 * | 12/2005 | Heins | C02F 1/04 166/266 |
| 2006/0032630 | A1 * | 2/2006 | Heins | C02F 1/04 166/266 |
| 2007/0051513 | A1 * | 3/2007 | Heins | E21B 43/24 166/265 |
| 2008/0110630 | A1 * | 5/2008 | Minnich | C02F 1/04 166/303 |
| 2009/0050467 | A1 * | 2/2009 | Fickenscher | B01D 1/12 202/185.1 |
| 2009/0101583 | A1 * | 4/2009 | Perry | B01D 61/58 210/664 |
| 2010/0038081 | A1 * | 2/2010 | Gamache | C02F 1/5245 166/267 |
| 2011/0139451 | A1 * | 6/2011 | McKeen | C02F 1/02 166/267 |
| 2011/0147316 | A1 | 6/2011 | Polizzotti et al. | |
| 2012/0087737 | A1 | 4/2012 | Minnich et al. | |
| 2012/0097609 | A1 | 4/2012 | Xia et al. | |
| 2012/0325743 | A1 | 12/2012 | Xia et al. | |
| 2013/0319663 | A1 * | 12/2013 | Buchanan | E21B 43/2406 166/272.3 |
| 2014/0083706 | A1 * | 3/2014 | Scott | F22B 37/26 166/305.1 |
| 2015/0252658 | A1 * | 9/2015 | Xia | C02F 9/00 166/303 |
| 2015/0259232 | A1 * | 9/2015 | Xia | C02F 9/00 166/267 |
| 2015/0292314 | A1 * | 10/2015 | Xia | C02F 9/00 166/266 |

FOREIGN PATENT DOCUMENTS

| | | |
|---|---|---|
| CN | 1902437 A | 1/2007 |
| CN | 102190380 A | 9/2011 |
| CN | 102452700 A | 5/2012 |
| CN | 102452700 B | 7/2014 |
| GB | 2357528 A | 6/2001 |
| GB | 2362333 A | 11/2001 |
| RU | 2 215 871 C2 | 11/2003 |
| WO | 2005054746 A2 | 6/2005 |
| WO | 2011115636 A1 | 9/2011 |

OTHER PUBLICATIONS

International Search Report Written Opinion dated Jan. 30, 2014 which was issued in connection with PCT Patent Application No. PCT/US13/056175 which was filed on Aug. 22, 2013.
Office Action issued in connection with corresponding CN Application No. 201380047845 dated Aug. 3, 2016.
Betzer-Zilevitch , "Steamdrive Direct Contact Steam Generation for SAGO," Canadian Society of Unconventional Gas, Society of Petroleum Engineers, Canadian Unconventional Resources Conference, Nov. 2011, pp. 1-19.
Chinese Patent Application No. 201380047910.9, Office Action dated Jul. 7, 2016.
Chinese Patent Application No. 201380047910.9, Office Action dated Nov. 11, 2017—English Translation not Available.
Chinese Patent Application No. CN201380047845, Office Action dated Dec. 19, 2017—English Translation Not Available.
International Patent Application No. PCT/US2013/055026, International Search Report and Written Opinion dated Jan. 30, 2014.
Oman Patent Application No. OM/P/2015/000059, Office Action dated Sep. 12, 2017—English Translation available.
Russian Patent Application No. 2015107264, Office Action dated Nov. 1, 2017—English Translation Available.
Russian Patent Application No. 2015107882, First Office Action dated May 11, 2017.
U.S. Appl. No. 14/657,492, Non-Final Office Action dated Sep. 22, 2017.
U.S. Appl. No. 14/657,492, Final Office Action dated Mar. 28, 2018.
Canadian Patent Application No. 2,789,822, Office Action dated Sep. 4, 2018.

* cited by examiner

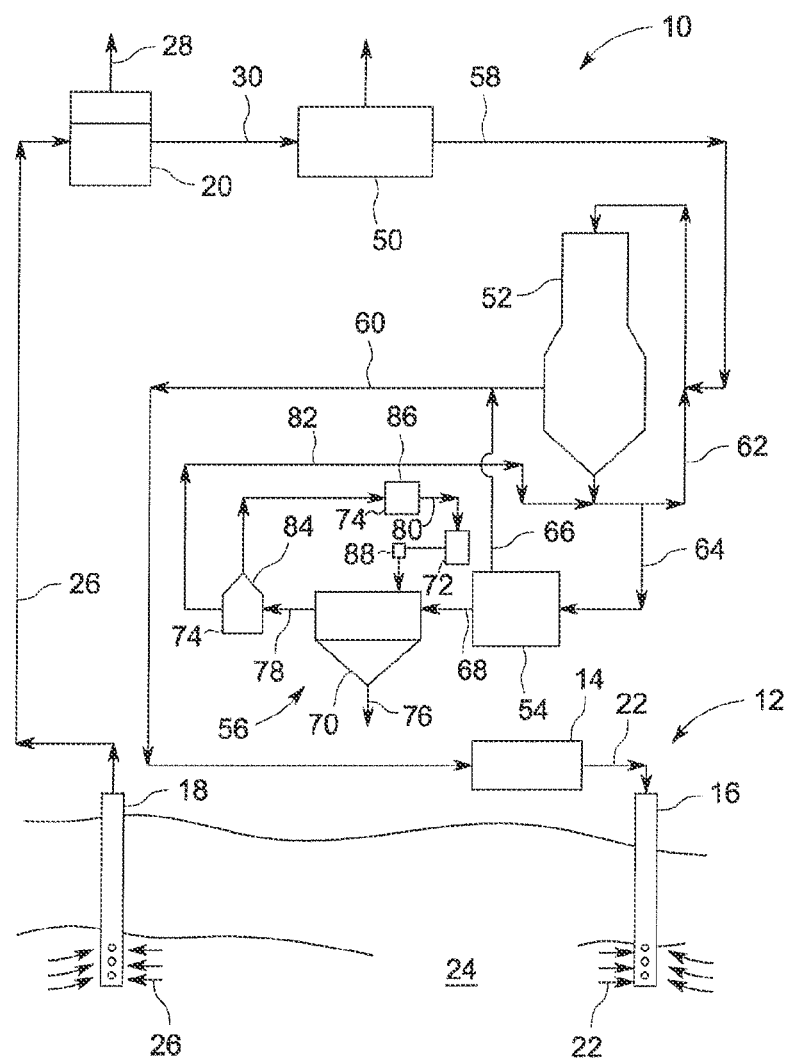

PRODUCED WATER TREATMENT AND SOLIDS PRECIPITATION FROM THERMAL TREATMENT BLOWDOWN

FIELD OF THE INVENTION

This specification relates to a method and apparatus for treating produced water and a method and apparatus for treating water by thermal or distillation based methods.

BACKGROUND

Canadian Patent 2 509 309 by Heins, entitled Water Treatment Method for Heavy Oil Production Using Calcium Sulfate Seed Slurry Evaporation, describes an evaporator based method of treating produced water from heavy oil production. Produced water is first treated in a de-oiling step to reduce oil and grease to about 20 parts per million or less. De-oiled water is introduced into an evaporator to produce a distillate and an evaporator blowdown containing concentrated residual solids. The distillate is used, optionally after further polishing, to create steam in a once-through steam generator or other boiler. The evaporator blowdown may be further treated in a crystallizer.

SUMMARY OF THE INVENTION

The following summary is intended to introduce the reader to the detailed description to follow and not to limit or define the claimed invention.

A crystallizer is ordinarily intended to produce dry, or easily dried, crystals made up of solids precipitated from water fed to the crystallizer. However, when a crystallizer is used to treat produced water, particularly produced water from heavy oil production, the crystallizer may instead produce a slurry. The slurry contains salts, for example silica salts, which may be at concentrations above their ordinary limits of solubility in water and yet the solids are not crystallized and cannot be easily separated from the slurry. Without intending to be limited by theory, the inventors believe that concentrated organic compounds from the produced water remaining in the slurry interfere with crystal growth and precipitation even for over saturated or dispersed salts in the slurry. In a method and apparatus described in this specification, an additional solvent of the organic compounds is mixed with the slurry. This causes or allows solids in the slurry to form precipitates or crystals which can be separated from the slurry.

In a method of treating water described in this specification, for example produced water from heavy oil extraction, vapour is removed from the water to produce a concentrate. The concentrate may be, for example, blowdown from one or more thermal treatment devices such as an evaporator or a crystallizer or both. The concentrate contains one or more salts, for example a silica salt, and one or more organic compounds. The concentrate is mixed with a solvent, for example methanol or ethanol, for the one or more organic compounds. Solids including precipitates of the one or more salts are removed from the mixture of concentrate and solvent. At least some of the solvent may be recovered from the mixture of concentrate and solvent.

An apparatus for treating produced water described in this specification comprises one or more thermal treatment devices, a solvent mixing vessel, a solvent feeding system and a solid-liquid separation device. A blowdown line from the one or more thermal treatment devices is connected to the solvent mixing vessel. The solvent mixing vessel is also in communication with the solvent feeding system. The solid-liquid separation device is incorporated with or downstream of the solvent mixing vessel.

The method and apparatus are useful, for example, in providing an alternative means of treating produced water, or other water containing dissolved salts and organic compounds. The method and apparatus may be incorporated into a method and apparatus for extracting heavy oil.

BRIEF DESCRIPTION OF THE FIGURE

FIG. 1 is a schematic process flow diagram of a produced water treatment system combined with a heavy oil extraction system.

DETAILED DESCRIPTION

FIG. 1 shows a water treatment system 10 in combination with a heavy oil, for example bitumen, recovery system 12. The heavy oil recovery system 12 has a boiler 14, an injection well 16, a production well 18 and an oil-water separator 20. The boiler 14 may be, for example, a once through steam generator (OTSG) or a packaged boiler. The boiler 14 produces steam 22 which flows to the injection well 16. Injection well 16 carries the steam 22 into a geologic formation 24 containing heavy oil, for example bitumen in the oil sands areas of Alberta, Canada. The steam 22 fluidizes bitumen in the formation 24 and later condenses. An oil and water mixture 26 is produced and withdrawn from the production well 18. The oil and water mixture 26 is sent to the oil-water separator 20. Product oil 28 is removed from the oil-water separator 20 for further refining. Produced water 30, which remains after the product oil 28 is removed from the oil and water mixture 26, flows to the water treatment system 10 for further treatment. The heavy oil recovery system 12 may be, for example, a steam assisted gravity drainage (SAGD) or cyclic steam stimulation (CSS) system.

The water treatment system 10 has a de-oiling unit 50, an evaporator 52, a crystallizer 54 and a blowdown treatment system 56. The de-oiling unit 50 receives the produced water 30 and removes additional oil, for example emulsified oil, from the produced water 30 to produce de-oiled water 58. The de-oiling unit 50 may be, for example, a dissolved gas flotation unit, a walnut shell filtration unit, a de-oiling polymer mixing tank, a membrane unit, a sorbent unit, or another device. A suitable evaporator 52 and crystallizer 54 are available from GE Ionics, Inc.

De-oiled water 58 is treated further in the evaporator 52, optionally after intermediate treatment steps. Evaporator 52 may be, for example, a mechanical vapour recompression (MVC or MVR) evaporator. The evaporator 52 may be seeded or un-seeded, and may use a falling film or other internal arrangement. The evaporator 52 may have associated equipment used, for example, to alter the pH of the de-oiled water or remove gasses or alkalinity from the de-oiled water 58. The evaporator 52 removes water vapour from the de-oiled water 58. The removed water vapour, when condensed, forms distillate 60 which is returned to the boiler 14 for re-use in the heavy oil recovery system 12, optionally after further treatment.

The evaporator 52 also has a brine recirculation loop 62 from which an evaporator blowdown 64 is withdrawn. The evaporator blowdown 64 has a high concentration of various contaminants that were present in the de-oiled water 58. In particular, the evaporator blowdown 64 has a high concentration of silica. In the absence of preferential precipitation crystals, adjusted pH, high temperature or other conditions maintained in the evaporator 52, the silica in the evaporator blowdown 64 becomes scale forming. The evaporator blowdown 64 is therefore not suitable for discharge in many locations.

In the water treatment system 10, the evaporator blowdown 64 is treated further in the crystallizer 54. Crystallizer 54 removes additional water vapour from the evaporator blowdown 64 which, when condensed, forms second distillate 66. Second distillate 66 may be returned to the boiler 14 for re-use in the heavy oil recovery system 12, optionally after further treatment.

The crystallizer 54 also produces a crystallizer blowdown 68. Crystallizer blowdown 68 has an even higher concentration of silica and other dissolved solids compared to the evaporator blowdown 64. Under some conditions, the crystallizer 54 produces precipitated solids that are easily dried. However, in other situations, particularly when treating produced water 30 from a steam or water flood assisted oil recovery operation, the crystallizer 54 instead produces a crystallizer blowdown 68 in the form of a slurry having a high solids concentration. At least one salt of silica, or other dissolved solids, or two or more of these, are likely to be present in the slurry under super-saturated or dispersed conditions but do not precipitate and settle from the slurry. For example, the crystallizer blowdown 68 may have a total solids (TS) content of 25 wt % or more, 40 wt % or more, or 50 wt % or more. The evaporator 52 and crystallizer 54 are types of thermal treatment devices, alternatively called distillation devices. Optionally, alternative thermal treatment devices, in one or more stages, or other concentrating devices, may be used to create slurry similar to the crystallizer blowdown 68.

The crystallizer blowdown 68 is sent to the blowdown treatment system 56. The blowdown treatment system 56 shown comprises a reaction vessel 70, a solvent dosing system 72 and a solvent recovery system 74. The crystallizer blowdown 68 and solvent from the solvent dosing system are added to the reaction vessel 70 and mixed together. The reaction vessel 70 may be, for example, a mixing tank or a conduit with in-line mixing. The reaction vessel 70 is, in an embodiment, closed or fitted with a vapour recovery device to avoid discharging solvent vapour to the atmosphere. The solvent dissolves one or more organic compounds in the crystallizer blowdown 68. Without intending to be limited by theory, the addition of the solvent appears to prevent the organic compounds from interfering with salt crystallization and allows inorganic solids, which may be already over-saturated, to precipitate rapidly. Precipitated solids 76 form, settle and are removed from the bottom of the reaction vessel 70, which acts as an integrated solid-liquid separation unit. The precipitated solids 76 include both inorganic salts and organic compounds. Alternatively, the precipitated solids 76 may be removed by a separate solid-liquid separation unit such as a centrifuge, filter, filter press, hydrocyclone or clarifier. In a further alternative, solvent may be recovered from the crystallizer blowdown 68 before or after the precipitated solids 76 are removed.

The crystallizer blowdown 68 may have a temperature higher than the boiling point of the solvent. However, the crystallizer blowdown 68 is viscous and sticky, and difficult to pass through any rapid cooling device such as a heat exchanger. A heat exchanger 88 is instead provided between the solvent dosing system 72 and the mixing tank 70 to cool the solvent by an amount sufficient to maintain a temperature in the reaction vessel 70 at least below the boiling point of the solvent. Waste heat captured in the heat exchanger 88 may be used, for example, in the solvent recovery system 74.

The solvent should be capable of dissolving one or more water soluble organic compounds present in the crystallizer blowdown 68. The organic compounds typically comprise a wide range of long chain hydrocarbons or oily substances that are difficult to fully analyze. However, it may be sufficient for the solvent to dissolve one or more of the organic compounds that make up a significant portion of the total organic compounds. The solvent should also be capable of forming a solution or other mixture with water under some conditions, but capable of being recovered from water under other conditions. The solvent may be used in a ratio of about 1:1 or more, or 2:1 or more, or 3:1 or more, solvent to crystallizer blowdown 68 by mass.

The remaining blowdown-solvent mixture 78 is sent to the solvent recovery system 74. In the example of FIG. 1, the solvent recovery system 74 is a thermal distillation unit having a heating vessel 84 and a condensing vessel 86. The solvent recovery system 74 separates the blowdown-solvent mixture 78 into recovered solvent 80 and waste brine 82. For example, the solvent may be recovered by heating the blowdown-solvent mixture 78 in the heating vessel 84 to a temperature above the boiling temperature of the solvent and below the boiling temperature of water. Optionally, the solvent may be recovered by applying a vacuum to the blowdown-solvent mixture 78, or by a combination of heat and vacuum. In the case of methanol, the blowdown-solvent mixture 78 may be heated to about 64.7 degrees C. or more at ambient pressure, or a lower temperature if a vacuum is applied. In the case of ethanol, the blowdown-solvent mixture 78 may be heated to about 78.2 degrees C. or more at ambient pressure, or a lower temperature if a vacuum is applied. Solvent vapour is collected and cooled in the condensing vessel 86 to produce liquid recovered solvent 80. Recovered solvent 80 is sent to the solvent dosing system 72 for re-use in the blowdown treatment system 56.

Methanol is a solvent in an embodiment since it is effective even when used with crystallizer blowdown 68 produced while treating SAGD produced water. Methanol also has a boiling temperature (about 64.7 degrees C.) that is close to the temperature of crystallizer blowdown 68 and does not form an azeotrope with water. Methanol is also readily available in industrial quantities. Methanol is completely miscible in water and so energy is required to separate methanol from water. However, because methanol can be used to treat very concentrated blowdown, for example with TS of 40 wt % or more, or water soluble organics at 5 wt % or more or 15 wt % or more, or both, the amount of solvent that must be recovered is reduced relative to a solvent that must be used with more dilute blowdown.

Ethanol is a solvent in another embodiment. Ethanol can also be used to treat very concentrated blowdown, particularly when used at an elevated temperature, for example 40 degrees C. or more or 60 degrees C. or more. The boiling point of ethanol (about 78.4 degrees C.) is close to the temperature of crystallizer blowdown 68 but ethanol forms a positive (minimum boiling) azeotrope with water at 78.2 degrees C. The azeotrope is about 95.6% ethanol and about 4.4% water. Since the crystallizer blowdown 68 is at least highly saturated, with solids removal inhibited primarily by the presence of organic contaminants, recycling the azeotrope, or a condensate near the azeotrope, to the solvent dosing system 72 is acceptable. For example, a condensate produced after single or multiple stage distillation with 90% ethanol or more may be returned to the solvent dosing system 72. However, techniques to separate azeotropic constituents, such as pressure swing distillation, azeotropic distillation, chemical action separation, salt-effect distillation, pervaporation or vapour permeation, may optionally be used.

Optionally, the evaporator blowdown 64 may be treated in the blowdown treatment system 56 without passing through the crystallizer 54. However, this would likely increase the amount of solvent required, and the energy consumed in optionally recovering the solvent, relative to a process in which the evaporator blowdown 64 is first concentrated further. Accordingly, in the case of methanol and ethanol which are capable of treat a very high solids concentrate, the crystallizer blowdown 68 is treated according to an embodiment.

The precipitated solids 76 typically include some, and possibly most, of the organic compounds in the crystallizer blowdown 68. The precipitated solids 76 may be treated to remove the organic compounds if required to meet discharge or disposal requirements relating to the precipitated solids. For example, the precipitated solids 76 may be dried, heated, exposed to UV radiation, exposed to microorganisms, embodied in cement, or washed with water, the solvent used in the solvent recovery system 74, or another solvent.

Some of the organic compounds are likely to remain in the waste brine 82. The waste brine 82 may be discharged or recycled to the water treatment system 10, for example by being sent back to the evaporator 52. Since the organic compounds interfere with the operation of the water treatment system 10, the waste brine 82 may be optionally treated if it will be recycled to the water treatment system 10. For example, chemicals may be added to the waste brine 82 to oxidize the organic compounds. Alternatively, or additionally, the organic compounds may be digested biologically. Organic and inorganic compounds may also be removed by membrane filters. In a further alternative, the organic compounds may be recovered for their value as industrial chemicals.

Although the treated waste brine 82 may be returned to the water treatment system 10, some or all of the waste brine 82 are removed from the water treatment system 10 according to some embodiments. Optionally, the waste brine 82 may be treated before it is discharged if required to meet any standards required for discharge or disposal. In this way, the waste brine 82 provides a bleed of water soluble organic compounds from the water treatment system 10 to inhibit the accumulation of any organic compounds that are not effectively removed by any process in the water treatment system 10.

EXAMPLE

Produced water from a SAGD operation in the oil sands region of Alberta, Canada, was de-oiled and treated in an evaporator. The evaporator blowdown was treated in a crystallizer. The crystallizer produced a slurry containing 66 wt % of TS. TS was measured by dividing the mass remaining after heating the slurry until it was dry at 105 degrees C. by the original sample mass. The TDS was about 41 wt %. TDS was measured by dividing the mass remaining after heating the slurry until it was dry at 650 degrees C. by the original sample mass. The concentration of water soluble organics (measured as TS minus TDS) was about 25 wt %. This slurry was mixed with methanol in a 3:1 ratio of methanol to slurry by mass. The mixing was done in a beaker at room temperature with agitation.

Precipitates formed essentially immediately after adding the methanol to the slurry. The slurry and methanol mixture was strained through a 5 micron pore size filter disk under vacuum to remove the precipitated solids. The precipitated solids had a dark colour suggesting that they contained a significant concentration of organic compounds. The solids were easily de-watered. In various trials, about 80-90% of the TS in the original slurry sample, including organic and inorganic solids, was collected on the filter. The portion of the mixture that passed through the filter was collected in a flask and transferred to a standard laboratory distillation set up. The mixture was heated to about 65 degrees C. to evaporate the methanol. The methanol vapour was collected, cooled and recovered in a second flask. The remaining water was a brownish colour but translucent suggesting that it contained some organic compounds, but at a concentration much less than in the slurry.

Similar tests conducted with ethanol on the same slurry also produced a precipitate but a higher mass ratio of solvent to slurry was required at room temperature. The precipitate was successfully filtered, but was sticky and more difficult to dry. However, when the ethanol and slurry were mixed at about 65 degrees C., the ethanol mixed readily with the slurry at a 3:1 ethanol to slurry mass ratio and an easily dried precipitate was produced.

In similar tests with isopropanol, the isoproponal did not mix with the slurry and produce a precipitate at either room temperature or a 65 degrees C.

In similar tests with diisopropylamine (DIPA), the DIPA did not mix with the slurry and produce a precipitate at room temperature. Higher temperatures were not tried since DIPA is more miscible with water at lower temperatures.

Although the system 10 has been described above as used for treating produced water from a steam flood or SAGD heavy oil recovery system 12, it may also be useful in other applications. Suitable applications may involve water to be treated that is super-saturated with a least one salt but also has a soluble organics concentration of 5 wt % or more. For example, in the production of ethanol a spent wash or vinasse is sometimes concentrated in an evaporator and produces a briny blowdown with a significant concentration of organic compounds. Other produced waters, or heavy oil tailing pond water, might also be concentrated and treated.

This written description uses examples to disclose the invention and also to enable any person skilled in the art to practice the invention. The patentable scope of the invention is defined by the claims, and may include other examples that occur to those skilled in the art.

The invention claimed is:
1. A process for extracting oil comprising the steps of:
a) producing steam;
b) injecting the steam into a formation comprising oil;
c) withdrawing a mixture of water and oil from the formation;
d) separating produced water from the mixture of water and oil;
e) treating the produced water to produce a distillate and a concentrate, the concentrate containing one or more salts and one or more organic compounds;
f) using the distillate to produce additional steam for injection into the formation;
g) mixing a solvent of the one or more organic compounds with the concentrate;
h) after step g), separating precipitated solids comprising the one or more salts from the mixture; and
i) recovering the solvent from the mixture with the concentrate and mixing recovered solvent with additional concentrate from step e).

2. The process of claim 1 wherein the oil is heavy oil or bitumen.

3. The process of claim 1, wherein steps a), b), and c) are part of a steam assisted gravity drainage (SAGD) or cyclic steam stimulation (CSS) operation.

4. The process of claim 1 wherein step e) comprises treating the produced water with an evaporator to produce an evaporator blowdown and treating the evaporator blowdown in a crystallizer to produce the concentrate.

5. The process of claim 1 wherein the solvent comprises methanol.

6. The process of claim 1 wherein the precipitated solids comprise silica.

7. The process of claim 1 comprising a step of removing the concentrate from the process after the steps of recovering solvent and separating precipitated solids.

8. The process of claim 1 comprising treating the one or more organic compounds in the concentrate and returning treated concentrate to the process at or upstream of step e).

9. A method for treating a mixture of water, one or more salts in solution and one or more organic compounds, the method comprising the steps of:
   a) removing water from the mixture to produce a concentrate, wherein the concentrate contains one or more of the organic compounds and one or more of the salts at a super-saturated concentration;
   b) mixing the concentrate with a solvent of the one or more organic compounds;
   c) removing solids comprising precipitates of the one or more salts previously at super-saturated concentrations from the concentrate; and
   d) recovering at least some of the solvent from the mixture of concentrate and solvent.

10. The method of claim 9 further comprising a step of mixing recovered solvent with additional concentrate from step a).

11. The method of claim 9 wherein the water comprises produced water.

12. The method of claim 11 wherein the produced water is extracted from a heavy oil containing formation after injecting steam into the formation.

13. The method of claim 9 wherein the concentrate comprises blowdown from one or more thermal treatment devices.

14. The method of claim 13 wherein the thermal treatment devices comprise an evaporator and a crystallizer.

15. The method of claim 9 further comprising a step of treating at least some of the concentrate after step c) to oxidize or remove the one or more organic compounds and returning the treated concentrate to step a).

16. The method of claim 9 wherein the concentrate at step a) is an aqueous composition comprising at least 40 wt % of total dissolved solids (TS).

17. The method of claim 9 wherein the mass of the solvent is at least equal to the mass of the concentrate.

18. The method of claim 9 wherein the solvent is selected from the group consisting of a) methanol and b) ethanol.

19. The method of claim 9 wherein the mixture resulting from step b) has a temperature of 40 degrees C. or more, wherein the temperature of the mixture is below the boiling point of the solvent.

20. The method of claim 9 wherein the solids further comprise the one or more organic compounds.

21. An apparatus for treating produced water comprising:
   a) one or more thermal treatment devices configured to treat the produced water and produce a blowdown stream;
   b) a solvent mixing vessel, the solvent mixing vessel in communication with the blowdown stream;
   c) a solvent feeding system in communication with the solvent mixing vessel, the solvent feeding system having a solvent for one or more organic compounds;
   d) a solid-liquid separation device; and
   e) a solvent recovery system downstream of the solvent mixing vessel.

22. The apparatus of claim 21 further wherein the solid-liquid separation device is incorporated with, or downstream of, the solvent mixing vessel.

23. The apparatus of claim 21 wherein the one or more thermal treatment devices comprise two or more thermal treatment devices in series.

24. The apparatus of claim 23 wherein the two or more thermal treatment devices comprise an evaporator and a crystallizer.

25. The apparatus of claim 21 wherein the solvent recovery system comprises a heat exchanger to cool recovered solvent.

26. The apparatus of claim 21 further comprising a treatment system adapted to oxidize or remove organic compounds downstream of the solvent recovery system.

27. A process for treating produced water from heavy oil extraction comprising the steps of:
   a) de-oiling the produced water;
   b) treating the de-oiled produced water in an evaporator to produce an evaporator blowdown;
   c) treating the evaporator blow down in a crystallizer to produce a crystallizer blowdown;
   d) adding a solvent selected from the group consisting of methanol and ethanol to the crystallizer blowdown;
   e) separating solids from the crystallizer blowdown; and
   f) after step d), recovering at least some of the solvent from the crystallizer blowdown.

28. The process of claim 27 further comprising a step of cooling the recovered solvent such that in step d) the recovered solvent cools the crystallizer blowdown to below the boiling point of the solvent.

29. The process of claim 27 wherein step d) comprises producing a mixture of the solvent and crystallizer blowdown having a temperature of 40 degrees C. or more, wherein the temperature of the mixture is below the boiling point of the solvent.

30. The process of claim 27 further comprising a step of treating the crystallizer blowdown to remove or oxidize one or more organic compounds in the slurry and returning treated slurry to, or upstream of, step b).

* * * * *